United States Patent

[11] 3,629,860

[72] Inventor Anthony J. Capozzi
Binghamton, N.Y.

[21] Appl. No. 875,137
[22] Filed Nov. 10, 1969
[45] Patented Dec. 21, 1971
[73] Assignee International Business Machines Corporation
Armonk, N.Y.

[54] RECORD LOCATE APPARATUS FOR VARIABLE LENGTH RECORDS ON MAGNETIC DISK UNITS
7 Claims, 4 Drawing Figs.

[52] U.S. Cl. .......... 340/172.5
[51] Int. Cl. .......... G11b 13/00
[50] Field of Search .......... 340/172.5

[56] References Cited

UNITED STATES PATENTS

| | | | |
|---|---|---|---|
| 2,680,239 | 6/1954 | Daniels et al. | 340/172.5 |
| 2,935,734 | 5/1960 | Donan et al. | 340/174.1 |
| 3,130,393 | 4/1964 | Gutterman | 340/174.1 |
| 3,187,316 | 6/1965 | Johnson et al. | 340/174.1 |
| 3,300,765 | 1/1967 | Trostrud | 340/172.5 |
| 3,337,852 | 8/1967 | Lee et al. | 340/174 |
| 3,412,386 | 11/1968 | Handley et al. | 340/174.1 |
| 3,449,735 | 6/1969 | Cogar | 340/174.1 |
| 3,348,213 | 10/1967 | Evans | 340/172.5 |
| 3,350,694 | 10/1967 | Kusnick | 340/172.5 |
| 3,437,998 | 4/1969 | Bennett | 340/172.5 |

OTHER REFERENCES

West, Data Transfer With Dynamic Priority Determination, IBM Tech. Disc. Bulletin, Dec. 1959

*Primary Examiner*—Gareth D. Shaw
*Assistant Examiner*—R. F. Chapuran
*Attorneys*—Hanifin and Jancin and John C. Black

ABSTRACT: Improved control apparatus which is independent of record format frees the channel of a central processor and/or the disk storage control unit connected to the channel until a read/write head and disk are relatively positioned for transfer of a selected record with minimum delay. In data processing systems having a plurality of magnetic disk drive units controlled by a common storage control unit, the improved apparatus determines the order in which selected variable length record positions on disks carried by the drive units become available to their respective read/write heads and renders the control unit effective to read or write a record only when that record is immediately available to its read/write head. In one arrangement the improved apparatus determines the length of time required for each selected record position to reach its respective read/write head and in the event that considerable delay will be encountered, it frees the channel and control unit for other processing work during the delay.

INVENTOR
ANTHONY J. CAPOZZI
BY John C Black
ATTORNEY

PATENTED DEC 21 1971 3,629,860

RECORD LOCATE APPARATUS FOR VARIABLE LENGTH RECORDS ON MAGNETIC DISK UNITS

FIELD OF THE INVENTION

The improved apparatus is used in data processing systems of the type in which one or more common control units each connect a plurality of magnetic disk storage units to the central processor by way of one or more channels in the processor.

The improved apparatus can, however, be applied to significantly improve the operation of process systems wherein the disk storage units are "natively" attached to the processor, i.e., the circuitry of the central processor is utilized to achieve the functions normally performed by the common control unit of a more sophisticated system.

In the preferred embodiment, a plurality of magnetic disks called a disk pack are rotated together by a drive unit. Both surfaces of each disk are adapted to store records. A plurality of read/write heads, one for each disk surface, are moved radially in unison to select a desired circular track in a group of tracks called a cylinder. Cylinders are assigned cylinder addresses and each track within a cylinder is assigned a track address. A plurality of records are stored in succession along each track. The track address is used to select the desired read/write head after the cylinder address has been used to position all read/write heads.

Once a record transfer between the CPU and a disk storage unit begins, the channel and control unit effecting the transfer are not free to perform other tasks until an entire record is transferred.

The improvement is directed to reducing the "latency" time during which the channels and control units are rendered ineffective while waiting for a selected disk record position to become accessible to its read/write head after the head has been positioned and selected.

DESCRIPTION OF THE PRIOR ART

Various arrangements have been suggested and reduce the wasted "latency" time experienced in today's systems, i.e., that time during which the channel and control unit circuits cannot be usefully operated while awaiting the transfer of a record to or from a magnetic disk file. However, in each of the suggested solutions to the problem, the means utilized is directed generally to and limited by the record format. Typical of the known systems is the provision of fixed length records, each record being stored in one sector of a disk track. The sector addresses of each record are written in positions immediately preceding their respective sectors and are scanned by the read/write heads to provide continuous disk position information. This information is then used in conjunction with sector address information provided by the central processor when access to a record is desired to determine the length of time required to obtain access to the record.

These earlier teachings do not lend themselves to systems wherein variable length records are stored. There is no suitable method or means for achieving the desired results by making use of record addresses stored on the disk. The exact physical location of a record on a disk in such a system cannot be determined with precision, and in fact it changes slightly each time that the record is rewritten after updating. The fact that the disks are interchangeable so that they can be used on any one of a plurality of different drives with different tolerances further complicates the problem.

Summary of the Invention

It is, therefore, the primary object of the present invention to provide an improved processing system wherein variable length records are stored in a plurality of magnetic disk storage units and wherein means are provided for freeing the control circuits for other useful work except when a desired record position is immediately available to its read/write head for transfer of the record to or from the disk.

This objective is achieved in a preferred embodiment of the invention by providing an electronic counter for each disk storage unit. Each disk (or disk pack) and disk drive unit has associated therewith an "index" pulse-producing means. During each revolution of the disk, an "index" pulse is produced as the read/write heads scan the beginning angular position or home address of the disk tracks along which records are written. This presently existing "index" pulse is utilized to reset to zero its respective electronic counter. A second pulse-generating means is used to increment all of the counters in common. The disk surfaces and tracks are thereby divided into a number of sectors equal to the number of different counter conditions. The first sector following the index pulse is "0", the next "1", and so on. Each counter at all times has a value stored therein which corresponds to the sector which is available to or about to become available to the read/write heads of its storage unit. When access to a selected record is desired, the central processor in come instances has available thereto a sector address value which corresponds to the respective counter value when the desired record is available to its read/write head. The address value is transferred to a sector register assigned to the selected storage unit and the CPU channel is free to perform other operations. Then the address value in the sector register is compared periodically (e.g. each change in counter value) with the value in the counter until an equal compare is obtained indicating that the record is available for transfer. The equal compare initiates a request for the channel to initiate a data transfer.

In larger, more sophisticated systems, the cylinder, track and sector addresses of all records may be maintained in a table lookup indexing arrangement. This permits use of the improvement during each read and write operation.

However, the typical processing system does not permit the maintenance of such large indices. Table searches are made to locate the desired cylinder and track address data for read/write head positioning. Additional means are then provided in the present improvement for determining in advance the sector addresses for at least a significant proportion of the record accessing operations.

One method and means provided by the improved apparatus to determine sector addresses for some operations is effective when a record is read from the disk for updating. This method and means includes provision for reading the value which exists in the respective sector counter immediately preceding reading of the record. This counter value is transferred to an allocated section in the main storage unit associated with the central processor and is subsequently utilized as the sector address of the record after updating has been completed and the updated record is returned to its location on the disk.

Thus, the present improvement is utilized for writing updated records even though it is not used during reading of the records.

Another method and means for minimizing the wasted "latency" time is with respect to the processing of records which are arranged sequentially on a disk unit for sequential reading, updating and storing back on the disk. In such a system, the sector address of the first record in a group of records is obtained during reading of that record as described above. The address is then utilized after updating of the record for transferring the record back to its original position on the disk with a minimum wasting of "latency" time. Since it is known that the next record to be read is that which followed the first record, the sector value which exists in the counter as the next record becomes available for reading is transferred to the CPU even though the next record cannot be read and transferred to the CPU until a later time interval; for example, the next revolution.

Thus, in a sequential operation the improvement can be used for all read and write operations in the sequence except for reading of the first record.

A preselected code combination precedes each record to indicate to the control unit the beginning of a new record.

.During read operations in which the sector address of the desired record is unknown, the code combination is sensed by decode circuitry and the decode circuitry gates the sector value from the associated counter into a sector register. In the event that the CPU requests the sector value of a desired record, the sector value (or a value equal to the difference between the sector value and a predetermined correction factor) is transferred from the sector register to the CPU.

DESCRIPTION OF THE PREFERRED EMBODIMENT

The record locate feature of the present application can be used with various types of systems having disk files. One particular advantage of the improved apparatus is the fact that it can be easily incorporated in systems existing in the field because it is not format dependent and because it utilizes signals and controls readily available in such units. The feature is incorporated by the addition of an electronic logic card including the required number of counters and a few registers and logic circuits.

Figure 1:
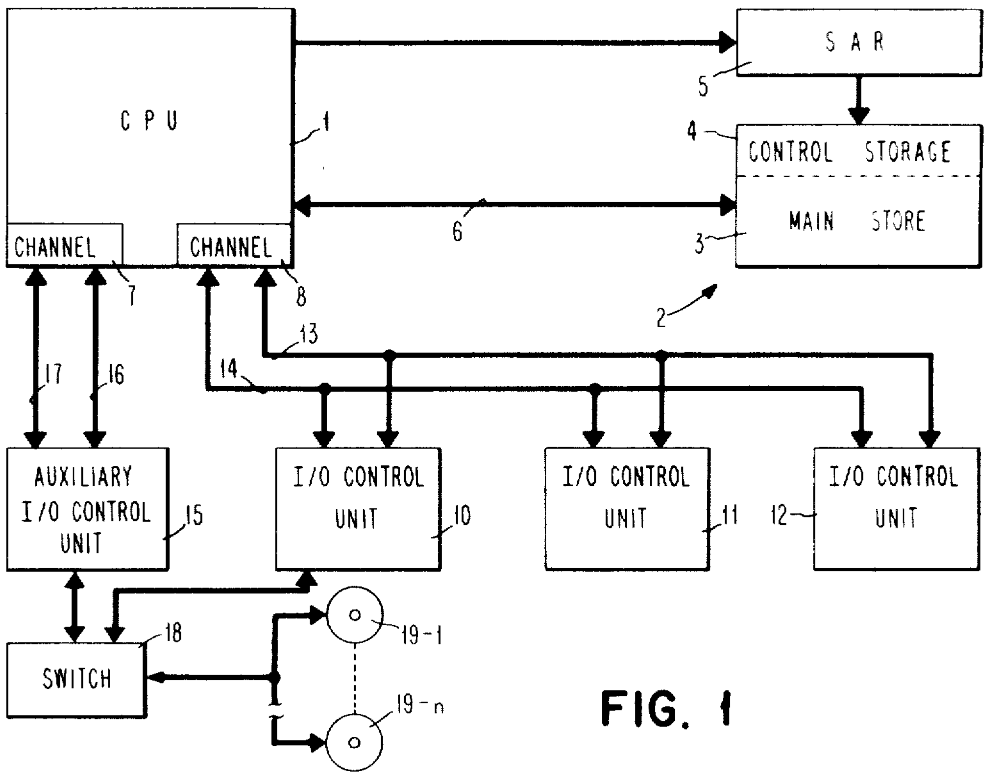
FIG. 1 is a fragmentary block diagram of a processing system within which the improved apparatus of the present application may be utilized to advantage.
Figure 2:
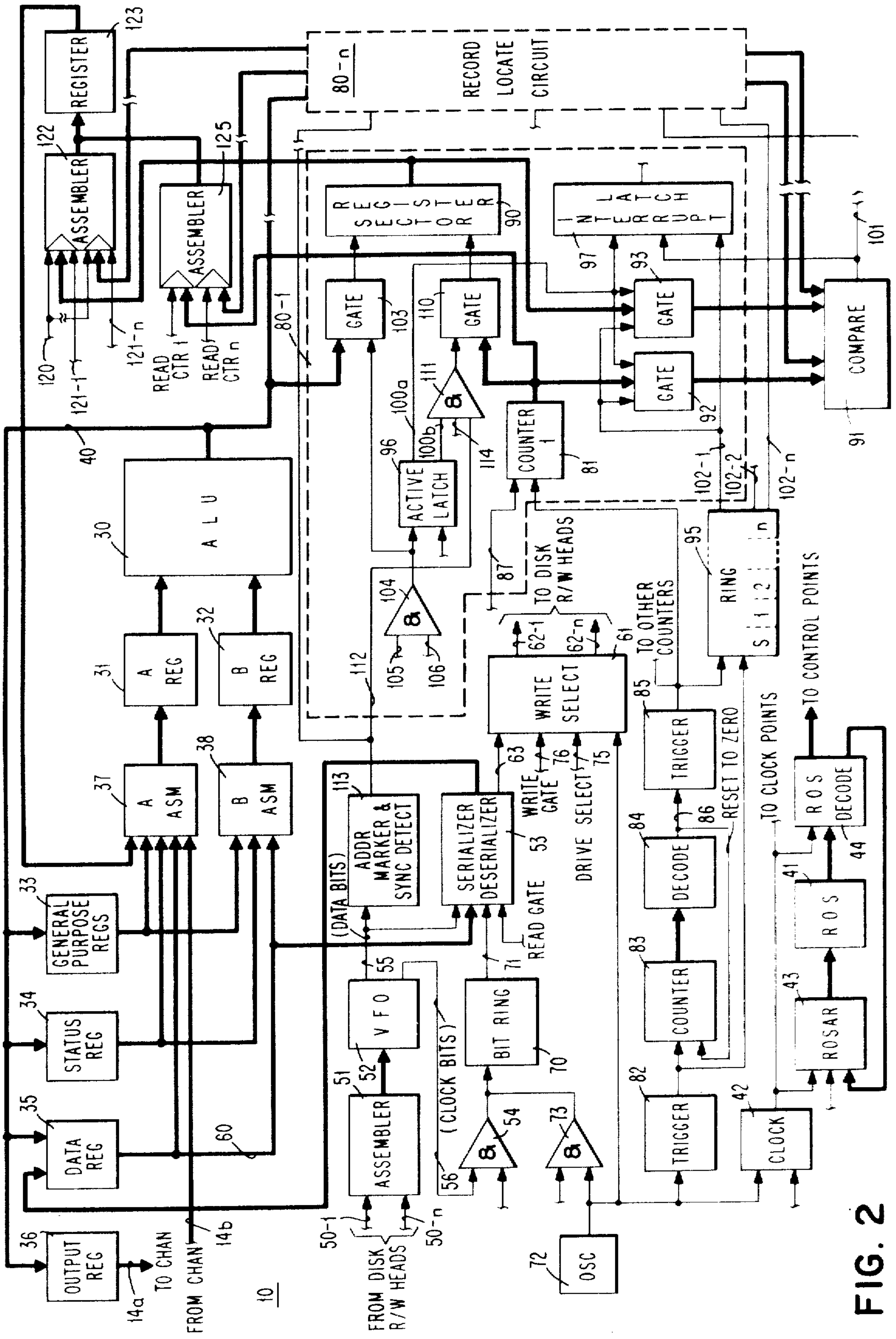
FIG. 2 is a fragmentary block diagram illustrating one preferred implementation of the present improvement.

For ease of description, it will be assumed that the improved apparatus of FIG. 2 is used in conjunction with a system (FIG. 1) of the type manufactured and distributed by International Business Machines Corporation under the name System 360 with a 2314 Direct Access Storage Facility which includes a storage control unit with up to eight operational disk drives. In addition, it is assumed that the system uses an auxiliary control unit of the type distributed by International Business Machines Corporation under the name 2844 Auxiliary Control Unit which permits overlapping operation of both control units to transfer records to and from the various disk units.

Briefly, each of the control units interprets commands from a channel associated with the central processor to cause various functions to be performed such as positioning read/write heads, locating records, reading or writing records or parts thereof, and transferring status information to the channel. To achieve its various functions, the control unit processes microprogram instructions contained in a read-only storage device. Part of each instruction typically specifies the address of a succeeding instruction to be processed whereby in normal operation the instructions are read out, decoded and executed in sequential fashion. The microprogram is divided into routines which perform particular functions such as resetting registers and disk drive control circuits, controlling data flow within the control unit, and controlling data flow between disks, the control unit and the channel. From the time power is turned on, the microprogram runs continuously and initially, after a reset routine, the microprogram operates in a loop waiting for the channel to select it for operation. Each time that the central processor executes an input/output instruction, the various control units decode the select code; and upon selection, the particular control unit causes the microprogram to proceed with housekeeping routines and then decode the particular command from the input/output instruction. Thereafter a particular routine is entered to execute command in a known manner.

The record format on the magnetic disk tracks is described generally in U.S. Pat. No. 3,312,948 issued Apr. 4, 1967 to A. J. Capozzi, the inventor herein. Briefly, the record comprises a series of equally spaced clock bits with the data bits interposed between clock bits. Each record is divided into count, key and data fields with gaps between each field, In the gap preceding each field is an address marker code combination and a sync code combination which indicate the beginning of a field and indicate the type of field, i.e., count, key or data.

FIG. 1 illustrates by way of example a processing system with which the improved apparatus of the present application is particularly well adapted for use. The system includes a microprogrammed CPU (central processor) 1, a storage unit 2 having a main storage section 3, and a control storage section 4. Access to various positions of the storage unit 2 is obtained by means of a storage address register 5 under control of the CPU; data and control signals are transferred between the storage device 2 and the CPU by means of a cable 6.

The preferred embodiment illustrates, by way of example, a CPU having two channels 7 and 8. The channel 8 is connected to control units 10, 11 and 12 by means of a data bus 13 and by means of a control but 14, including a plurality of tag lines which are effective to provide the required control interconnections between the channel and its respective control units.

For purposes of illustration, it is assumed that the control unit 10 is of the type described above and identified as a 2314 Storage Control Unit. The channel 7 is connected to an auxiliary storage control unit 15 by way of data but 16 and a control bus 17. It will be assumed for purposes of the present description that the auxiliary control unit 15 is of the type described above and referred to as a 2844 Auxiliary Storage Control Unit. A switch 18 interconnects the control units 10 and 15 with a plurality of disk drive units 19-1 to 19-*n* in a known manner.

When access to a particular disk 19-1 to 19-*n* is desired in response to an input/output instruction, the control unit 10 is selected via the channel 8, or alternatively the control unit 15 via channel 7, to effect an access of a desired record. Data is transferred to and from the disks 19-1 to 19-*n* by way of the switch 18 and alternatively the control unit 10 or the control unit 15.

The operation of systems such as that illustrated in FIG. 1 is well known and will not, therefore, be further described.

FIG. 2 is a fragmentary illustration of the control unit 10 embodying a preferred form of the improvement of the present application. The control unit 10 includes an ALU (arithmetic and logic unit) 30 having input A and B registers 31 and 32, general purpose registers 33, status, data and output registers 34, 35 and 36. A and B assemblers 37 and 38 gate data from the registers 33–36 to the ALU 30 via the A and B registers 31, 32. The output of the ALU 30 is applied to the various registers by way of a destination bus 40.

The cable 14 (FIG. 1), which provides data and command signal paths between the channel 8 and the control unit 10, has one portion thereof, 14*a* (FIG. 2), connected to the output of the register 36 and another portion 14*b* connected to the input of the A assembler 37.

The transfer of data and controls between and ALU and the various registers and the gating of the data on the various registers and the gating of the data on the various buses are achieved in a known manner by means of a read-only storage device 41 and its associated clock 42. The storage device 41 is addressed by means of a read-only store address register 43. Microprogram control words read out of the storage device 41 are decoded in a read-only store decode circuit 44 to effect the various data transfers and execute commands as required. The system is initially put into operation by applying a start pulse to the line 45 at the input of the address register 43. This initiates the continuous operation of the microprogram stored in the device 41.

The read/write heads of each drive unit 19-1 to 19-*n* are coupled to an assembler 51 by way of a respective one of the conductors 50-1 to 50-*n*. The read/write heads of each storage unit 19-1 to 19-*n* are selectively connected to the opposite end of their respective line 50-1 to 50-*n* by suitable switch means (not shown). The assembler 51 selects a desired one of the lines 50-1 to 50-*n* when transfer of a record from a corresponding storage unit is desired and couples the selected line to a variable frequency oscillator 52.

The oscillator 52 separates data bits from clock bits in each record and applies the data bits to a serializer/deserializer circuit 53 and the clock bits to an AND circuit 54 by way of lines 55 and 56, respectively. Serial data on line 55 applied to the circuit 53 is changed from a serial-by-bit to serial-by-byte format and applied to the data register 35 by way of a cable 56. The microprogram then effects transfer of each byte from the register 35 to the channel 8 by way of the data register output bus 60, the assembler 37 and 38, the register 31 or 32, the ALU 30, the destination bus 40, the output register 36 and the cable portion 14*a*.

Data is transferred from the channel 8 to selected read/write heads by way of the incoming bus portion 14*b*, A assembler 37, the A register 31, the ALU 30, the destination bus 40, the data register 35, the serializer/deserializer circuit 53, the write selection circuits 61, and lines 62-1 to 62-*n* which are coupled in a well-known manner to the read/write heads of disk units 19-1 to 19-*n*. It will be appreciated that the transfer of data between the channel 8 and the disk units 19-1 to 19-*n* over the paths described above will be effected by means of several microprogram steps which are not necessarily in continuous time sequence.

During a read operation, the serializer/deserializer circuit 53 is under the control of a bit ring 70 which is coupled thereto by way of a cable 71. Clock pulses applied to the AND circuit 54 advance the bit ring to control the transfer of data bits through the circuit 53.

The bit ring 70 is also utilized to control the transfer of data bits through the circuit 53 during write operation. In this instance, the output of an oscillator 72 is gated to the bit ring 70 by way of an AND circuit 73. In addition, the oscillator output pulses are applied to the write selection circuit 61. A drive select line 75 and a write gate line 76, which originate in the read-only store decode circuits 44, are also applied to the write selection circuit 61 to control the transmission of data to the appropriate read/write head.

The circuits described above are well known in the art and further detailed description is therefore not given.

The circuits of FIG. 2 which provide the improved performance for the system will now be described in detail. A plurality of record locate circuits 80-1 to 80-*n* are provided, one for each of the disk units 19-1 to 19-*n*. Each of the circuits is essentially identical to the others, and therefore only one of the circuits 80-1 is shown in detail. The circuit 80-1 corresponds to and in part controls the transfer of data to and from the disk unit 19-1.

The circuit 80-1 includes a sector counter 81 which is utilized to continuously keep track of the angular position of the disk pack carried by the drive unit 19-1 in relation to the read/write head. The disk is divided into 128 sectors in the preferred embodiment as illustrated in the timing diagram of FIG. 3. Therefore, the sector counter 81 is reset to zero at an index position time and is advanced sequentially to a count of 127 during one revolution of the disk after which the next index time occurs to reset the counter to zero.

In the preferred embodiment, the sector counter 81 is advanced by a circuit including the oscillator 72, a bistable trigger 82, a counter 83, a decode circuit 84 and a bistable trigger 85. The trigger 82 is set and reset by each pair of oscillator cycles. The counter 83 is advanced by a count of 1 each time the trigger 82 is reset. The decode circuit 84 produces an output on line 86 each time that the counter 83 reaches a value of 250. Two consecutive pulses on line 86 advances the trigger 85 to its set and reset states. Each reset of trigger 85 advances the counter 81 by a count of 1.

Figure 3:
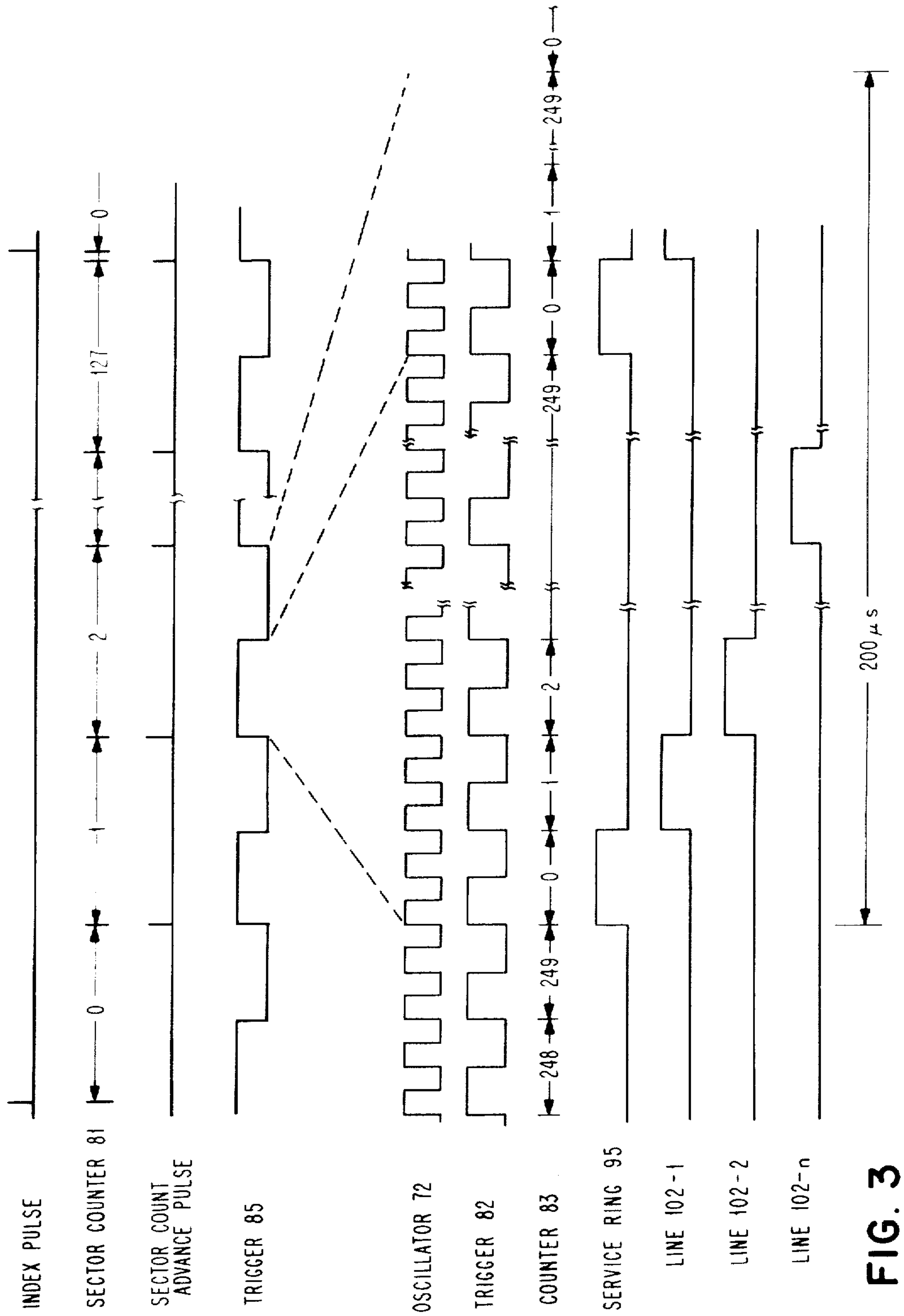
FIG. 3 is a timing diagram illustrating a preferred form of timing control for a counter.

The relationship of the signals and count values for the circuits 72, 82, 83, 84 and 85 is shown in FIG. 3. Each reset of the trigger 85 advances the sector counter 81 by a count of 1. The counter 81 is advanced through its 128 positions in a period of time substantially equal to the time required for one complete revolution of a disk.

The disk pulse on line 87 which resets the sector counter 81 to zero is controlled by the disk drive and therefore any errors due to discrepancies between the substantially constant incrementing means and the variations in the rotational speed of the various disk drive units are not cumulative from revolution to revolution. The index pulse on line 87 always resets the sector counter to zero when the home address of the tracks in a disk pack reach the same relative angular position with respect to their read/write heads.

The circuit 80-1 also includes a sector register 90 which is utilized for two functions. When the channel 8 initiates a request to transfer a record to or from the disk unit 19–1 and has the sector address of the record, it issues a SET SECTOR command to transfer this address value into the sector register 90 for subsequent comparison with the momentary values in the sector counter 81 in a compare circuit 91. The channel then issues a READ DATA command which will be executed after an equal compare is achieved in the compare circuit 91.

The second function of the sector register 90 is to store the sector address of a desired record (i.e., the value in the counter 81 when reading of the record begins). Subsequently, in response to a channel request for the sector address (i.e., READ SECTOR command), the sector address is transferred from the sector register 90 to the CPU 1.

An active latch 96 determines the function of the sector register 90. The latch 96 is set by a SET SECTOR command and remains set until the desired record has been transferred. In its set state, the latch 96 inhibits transfer of the sector value in counter 81 to the sector register 90 and partly prepares the means for comparing the sector counter and sector register values.

Gating of the values in the sector counter 81 and the sector register 90 to the compare circuit 91 is achieved by means of gate circuits 92 and 93. The true output 100*a* of the active latch 96 partly prepares gate circuits 92, 93 when the latch is in its set state. Immediately following the advancing of the sector counter 81 to each new count, a ring circuit 95 applies a pulse to the gates 92 and 93 via line 102–1 followed by succeeding pulses on lines 102–2 to 102–*n* to corresponding gates in the remaining record locate circuits 80-2 to 80-*n* in consecutive order. Each one of these pulses from the ring 95 gates the contents of the sector counter and the sector register of the corresponding record locate circuit into the compare circuit 91 if the active latch of the record locate circuit is in its set state. In the event that the values in the counter 81 and the register 90 are equal, the compare circuit 91 applies a signal to the interrupt latch 97 via line 101. With signals simultaneously occurring on the lines 100*a*, 101 and 102–1, the interrupt latch 97 is set to initiate a microprogrammed routine which brings up a tag line indicating to the channel 8 of the central processor that the desired record is closely adjacent the position where it is accessible to the read/write head.

The ring 95 has a start position S and additional positions 1 to *n*, each position corresponding to one of disk units 19–1 to 19-*n*. Each time that the trigger 85 produces an output pulse for advancing the sector counter 81, it also sets a binary one value in the S or start position of the ring 95. This binary one value is advanced through succeeding positions "1" to "*n*" of the ring by succeeding output pulses from the trigger 82. When the binary one value is transferred into the "1" position in the ring 95, it causes a signal to be applied to the output line 102–1 from the ring; while the binary one value is in the positions "2" to "*n*" of the ring 95, the corresponding output line 102–2 to 102–*n* has an output signal applied thereto.

When the sector address of a desired record in the disk unit 19-1 is transferred to the sector register 90, the sector address is first transferred from the main store device 3 to the channel 8 and then from the channel 8 to one of the general purpose registers 33 via cable portion 14*a*, assembler 37, register 31, ALU 30 and destination bus 40, partly under microprogram control. This value is then transferred from the general purpose register to the sector register 90 by way of the assembler 37 or 38, the register 31 or 32, the ALU, the destination bus 40, and a gate circuit 103. The gate circuit 103 is rendered effective in response to an output pulse from an AND circuit 104 upon coincident application of a unit select signal and a gate sector register signal to lines 105 and 106 which originate in the read-only store decode circuits 44. The output of the AND circuit 104 also causes the active latch 96 to be set.

Sector addresses are transferred from the sector counter 81 to the sector register 90 by way of a gate circuit 110 in response to output pulses from an AND circuit 111.

One input to the circuit 111 is the complement output 100*b* of the active latch 96. In the reset condition of the latch 96, a signal on line 100*b* conditions the circuit 111.

The output 112 from an address marker and sync detect circuit 113 forms another input to the circuit 111. During the execution of read commands, the circuit 113 is effective to indicate the start of each field of each record being transferred from one of the storage units 19-1 to 19–*n*. The detection of each address marker followed by a sync code combination indicating the beginning of a record (i.e., the beginning of the first or count field) causes an output pulse to be applied to line 112.

A third input line 114 to the AND circuit 111 is energized when the data being transferred to the circuit 113 originates from the storage unit 19-1 which corresponds to the record locate circuit 80–1. The line 114 originates in the decode circuit 44.

The AND circuit 111 is effective to gate the value in the counter 81 into the sector register 90 when signals appear simultaneously on the input lines 112, 114 and 100*b*.

The transfer of a sector address from the sector register 90 to the main store device 3 is initiated by a read sector signal on line 120 and a unit select signal on the line 121–1. The lines originate in the read-only store decode circuit 44 and form inputs to an assembler 122. The signals on lines 120 and 121–1 cause the assembler 122 to transfer the sector address from the register 90 to the register 123. The sector address is then transferred from the register 123 to the CPU 1 over a path including A assembler 37, A register 31, ALU 30, destination bus 40, output register 36, and cable portion 14*a*. A second assembler 125 is similarly effective to transfer a count value directly from counter 81 (or other corresponding counters) to the main store device 3 when a signal is applied to the READ COUNTER 1 line (or other corresponding lines such as READ COUNTER *n*), for example, at the beginning of the write cycle when a record is written for the first time and its address is desired for entry into an index or the like.

As indicated earlier the various operations described above are controlled by the microprogram in the read-only store device 41 and by commands emanating from the channel 8 in a known manner.

Attention is directed to the various lines which are connected to the record locate circuits 80-1 to 80–*n*. The destination bus 40, the gate sector line 106, the output 112 of detect circuit 113, the output of trigger 85 and the output 101 of compare circuit 91 are each connected to all circuits 80–1 to 80–*n* in a manner similar to that shown in circuit 80-1. The ring 95 has one output connected to each respective circuit 80–1 to 80–*n*; and one unit select line such as line 105 is provided for each circuit 80-1 to 80–*n*. The compare circuit 91 is connected to a pair of cables from each circuit 80–1 to 80–*n*.

Figure 4:
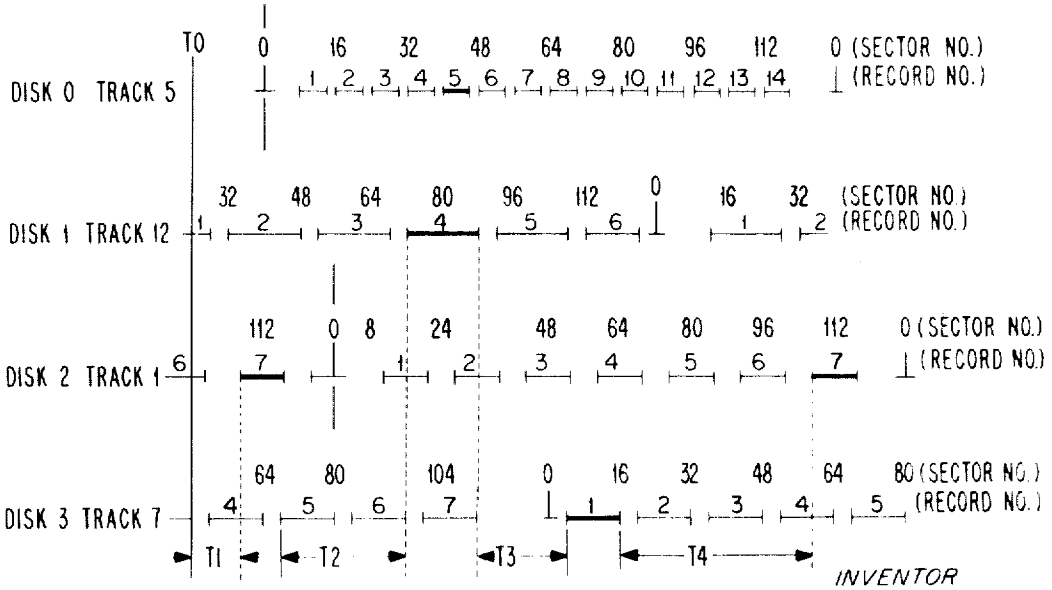
FIG. 4 illustrates the sequence of disk operations in an example utilizing four disk devices.

In the example shown in FIG. 4, it is assumed that there are four disk storage units 19–1 to 19–4. It is further assumed that at some time TO, the read/write heads have been positioned to the cylinder addresses set forth and that the read/write heads having access to the track addresses set forth have been selected. Fourteen records are stored along track 5 of cylinder 0 of the disk unit 19–1; six records, along track 12 of cylinder 1 of disk unit 19–2; and so on. The records in each track are shown as being of equal length; however, in different tracks the record length differ from each other.

The heavy lines under record number 5 of track 5, record number 4 of track 12, record number 7 of track 1 and record number 1 of track 7 indicate that access to these records is desired. The index pulses for the various units 19-1 to 19–4 occur at different times; and, therefore, the sector counter values in FIG. 4 for the various units 10–1 to 19–4 differ from each other at any given time. Thus, the counter values at TO are approximately 112, 25, 96 and 48.

If we further assume that at TO the sector addresses of the desired records 5, 4, 7 and 1 mentioned above have been entered into the respective sector registers such as register 90 of FIG. 2, the channel 8 and/or the control unit 10 are free to perform other tasks.

After the expiration of time period T1, an equal compare is obtained in the compare circuit 91 of FIG. 2 with respect to record 7 in disk unit 19–3. The interrupt latch of record locate circuit 80–3 is set; and the control unit 10 sends a request signal to the channel 8. Assuming the channel can accept the request, it issues an appropriate command (e.g., read or write) for accessing the record 7.

After the access to record 7 has been completed, i.e., the beginning of time interval T2, the channel 8 and the control unit 10 may be freed for other functions.

Assume that read, updating and writing the records 5, 4, 7 and 1 is desired in the example of FIG. 4. An adequately large storage area in the main store 3 would permit reading of records 4, 7 and 1 during one disk revolution illustrated in FIG. 4 with freeing of the channel 8 and control unit 10 occurring during times T1, T2, T3 and T4. With high-speed CPU updating of the records, they could be returned to their track positions during the next revolution. However, record 5 does not become accessible during the two revolutions until both the channel 8 and control unit 10 are locked up during processing of record 4. Hence, processing of record 5 begins during the third revolution.

However, in many systems the maximum record lengths and the available main storage area do not permit the reading of a second record until processing of the first is complete. With such an arrangement, record 7 of FIG. 4 is read and updated during the first revolution and the updated record is returned to its position in track 1 during the second revolution. Record 4 is then read during the second revolution, updated and returned to track 12 during the third revolution. During the third revolution, record 5 cannot be accessed because it is overlapped by record 4; hence, record 1 is read and returned to track 7 during the fourth revolution. Record 5 must wait until the fifth revolution to be read, assuming other records in units 19–2 to 19–4 have not been selected for access in the meantime.

Sector addresses for FIG. 4 can be obtained in two ways: (1) a system having all sector addresses in an index, or (2) a programming method which computes estimated sector values from an algorithm which makes use of known format information.

In more sophisticated systems, it may be desirable to utilize a microprogram routine in control unit 10 to calculate the "latency" time periods for selected records in each unit 19–1 to 19–*n*, determine which period is the smallest, and further determine from a table of functions whether the smallest "latency" time permits completion of one or more of the functions (e.g., housekeeping) it is desired to perform before the closest selected record becomes available to its read/write head. A recalculation is made after each selected record is processed and after each additional function is performed.

It will be appreciated that the rotational speeds of the disk units 19–1 to 19–*n* can vary within the limits of their tolerances. The disks are interchangeable on the units 19–1 to 19–*n*; and, since the counters 81 are advanced at a constant rate, a record can be accessed at slightly different counter sector values depending upon which unit 19–1 to 19–*n* carries it. A microprogram routine in the read-only store unit can be utilized where desired to subtract a worst case correction factor (e.g., 4 percent) from sector address values transferred from the counter 81 to a table lookup index to assure a sufficiently early equal compare in later searches for the desired records by means of the addresses in the index.

Another alternative is the substitution for the common oscillator 72 and its associated circuits for advancing the sector address counters of a means (not shown) on each unit 19-1 to 19-n for producing a pulse for each predetermined angular movement of the drive unit thereof. In a different modification, a shaft position encoder (not shown) on each drive unit can be substituted for the sector counters and their advance pulse means.

While the invention has been particularly shown and described with reference to a preferred embodiment thereof, it will be understood by those skilled in the art that suggested changes in form and details may be made therein without departing from the spirit and scope of the invention.

What is claimed is:

1. In apparatus of the type in which a central processing unit is operated in accordance with a stored program, in which a plurality of drive units present to read/write heads, thereof, magnetic disk surfaces having variable length data records stored in a plurality of storage locations arranged in circular tracks thereon, and in which control means are provided for transferring records between the drive units and the processing unit in accordance with instructions in the program, the combination therewith of means for releasing the control means for other functions until selected record locations are immediately available to their respective read/write heads for the transfer of data to and from the locations, comprising an electronic counter assigned to each drive unit to provide sector addresses of records on its respective disk surfaces, means for setting each counter to zero each time an index position of its respective disk surfaces reaches a predetermined position relative to the read/write heads, and means continuously incrementing the counters as the disk surfaces rotate through one complete revolution to the next index position whereby the counter value continuously indicates the sector address of those data positions on the disk surfaces which are immediately available to their respective read/write heads for the transfer of data, means for storing the sector address of a selected record, means controlled to transfer to the sector address storing means the value which exists in the respective counter at the beginning of a transfer of the selected record between the processing unit and the respective drive unit, and means thereafter effective, during the transfer of said selected record between a drive unit and the processing unit, for periodically comparing said transferred counter value with the momentary values of the respective counter as it is incremented and for initiating the transfer operation only upon the detection of a predetermined relationship between the sector address and the momentary counter value.

2. The apparatus of claim 1 wherein a channel cooperates with the central processing unit and the control means to effect the transfer of records between the central processing unit and the disk surfaces, and wherein means are provided for freeing the channel during the comparison between the sector address and the counter values.

3. In apparatus of the type in which a central processing unit is operated in accordance with a stored program, in which a plurality of drive units present to read/write heads, thereof, magnetic disk surfaces having variable length data records stored in a plurality of storage locations arranged in circular tracks thereon, and in which a storage control unit is provided for transferring records between the drive units and the processing unit in accordance with instructions in the program, the combination therewith of means for releasing the storage control unit for other functions until selected record locations are immediately available to their respective read/write heads for the transfer of data to and from the locations, comprising an electronic counter assigned to each drive unit to provide sector addresses of records on its respective disk surfaces, means for setting each counter to zero each time an index position of its respective disk surfaces reaches a predetermined position relative to the read/write heads, and means continuously incrementing the counters as the disk surfaces rotate through one complete revolution to the next index position whereby the counter value continuously indicates the sector address of those data positions on the disk surfaces which are immediately available to their respective read/write heads for the transfer of data, means for transferring to the central processing unit the value of a selected one of the counters which corresponds to the sector address of the physical location of the beginning of a selected record, and means subsequently effective during the transfer of said selected record to said physical location, for periodically comparing said transferred counter value with the momentary values of said one counter as it is incremented and for initiating a write operation only upon the detection of a predetermined relationship between the transferred counter value and the momentary counter value.

4. The apparatus of claim 3 wherein a channel cooperates with the central processing unit and the storage control unit to effect the transfer of records between the central processing unit and the disk surfaces, and wherein means are provided for freeing the channel unit for other functions for freeing the channel unit for other functions during the latency time in which the transferred counter value and the momentary counter values are being compared.

5. In apparatus of the type in which a central processing unit is operated in accordance with a stored program, in which a plurality of drive units present to read/write heads, thereof, magnetic disk surfaces having variable length data records stored in a plurality of storage locations arranged in circular tracks thereon, and in which control means are provided for transferring records between the drive units and the processing unit in accordance with instructions in the program, the combination therewith of means for releasing the control means for other functions until selected record locations are immediately available to their respective read/write heads for the transfer of data to and from the locations, comprising a counter assigned to each drive unit to provide sector addresses of records on its respective disk surfaces, means for setting each counter to zero each time an index position of its respective disk surfaces reaches a predetermined position relative to the read/write heads, and means continuously incrementing the counters as the disk surfaces rotate through one complete revolution to the next index position whereby the counter value continuously indicates the sector address of those data positions on the disk surfaces which are immediately available to their respective read/write heads for the transfer of data, a respective sector address register assigned to each drive unit, means for transferring the sector address of a selected record location to the sector address register assigned to the drive unit on which the record location is maintained, and means for comparing the value in the sector address register with the values of the associated counter as it is incremented and for producing an output signal upon the detection of a predetermined relationship between the sector address and the counter value which is indicative of the immediate availability of the record location to the respective read/write head.

6. The apparatus of claim 5 wherein the counter is a binary electronic counter, and the means for incrementing the counter includes an electronic oscillator means for applying advance pulses to all of the counters to increment the counters at a predetermined rate.

7. The apparatus of claim 5 together with means effective during the reading of a selected record on a drive unit for transferring to the sector address register, the sector address value existing in the respective counter assigned to the drive unit at the beginning of the reading of the selected record, and means for transferring the latter sector address value from the sector address register, and whereby the latter sector address can be used subsequently to locate its record location when the record is returned to said location.

* * * * *